United States Patent [19]

Allsop et al.

[11] Patent Number: 4,635,154
[45] Date of Patent: Jan. 6, 1987

[54] CLEANING RIBBON AND METHOD FOR CLEANING A VIDEO PLAYER/RECORDER

[75] Inventors: James D. Allsop; Eivind Clausen, both of Bellingham, Wash.

[73] Assignee: Allsop, Inc., Bellingham, Wash.

[21] Appl. No.: 565,206

[22] Filed: Dec. 23, 1983

[51] Int. Cl.[4] .................. G11B 5/10; G11B 5/127; G11B 5/41; G11B 23/02

[52] U.S. Cl. .................. 360/128; 360/132; 360/134

[58] Field of Search ............... 360/137, 128, 134, 132

[56] References Cited

U.S. PATENT DOCUMENTS

| | | | |
|---|---|---|---|
| 3,554,798 | 1/1971 | Nacci | 360/134 |
| 3,655,441 | 4/1972 | Kefalas | 360/134 |
| 3,773,276 | 11/1973 | Ganske | 360/134 |
| 3,789,452 | 2/1974 | Nemoto | 360/134 |
| 3,893,181 | 7/1975 | Desourdis | 360/136 |
| 4,011,358 | 3/1977 | Roelofs | 360/134 |
| 4,266,256 | 5/1981 | Kato et al. | 360/134 |
| 4,387,411 | 6/1983 | Clausen et al. | 360/137 |
| 4,408,241 | 10/1983 | Ogawa | 360/128 |
| 4,417,290 | 11/1983 | Tanaka et al. | 360/134 |
| 4,498,113 | 2/1985 | Clausen et al. | 360/137 |

FOREIGN PATENT DOCUMENTS

| | | | |
|---|---|---|---|
| 58-158018(A) | 9/1983 | Japan | 360/137 |
| 1359052 | 7/1974 | United Kingdom | 360/132 |
| 1475938 | 6/1977 | United Kingdom | 360/132 |
| 1482410 | 8/1977 | United Kingdom | 360/132 |
| 1553550 | 9/1979 | United Kingdom | 360/132 |
| 2066999A | 7/1981 | United Kingdom | 360/128 |
| 2090460 | 7/1982 | United Kingdom | 360/132 |

Primary Examiner—John H. Wolff
Assistant Examiner—Alfonso Garcia
Attorney, Agent, or Firm—Hughes & Cassidy

[57] ABSTRACT

A cassette cleaner for a video player/recorder having a cleaning ribbon which comes into frictional engagement with the drum and playing head of the player/recorder. The ribbon has a contact surface with an alternating pattern of raised portions and recessed portions. This lessens the drag created by the engagement of the ribbon with the drum and playing head.

22 Claims, 10 Drawing Figures

CLEANING RIBBON AND METHOD FOR CLEANING A VIDEO PLAYER/RECORDER

TECHNICAL FIELD

The present invention relates to a method and apparatus for cleaning operating components of a video player/recorder.

BACKGROUND ART

In recent years, video player/recorders have become quite popular. Typically, there is a video head which either records or plays back the video portion of the playing tape, an audio head which performs the same functions for the sound portion of the tape, an erase head, and possibly other components which engage the tape. For proper operation of the player/recorder, it is desirable that the surface portion of at least some (and desirably all) of these components which contact the tape be cleaned periodically. There are in the prior art cassette cleaners which have a cassette housing in which is mounted a cleaning ribbon. In operation, the cassette housing is placed into a playing receptacle of the player/recorder, and the start knob or button is moved to the "on" position so that guide members of the player/recorder engage the cleaning ribbon and bring it into engagement with at least the drum of the video head, and in some instances, the other operating components which would normally come into contact with the playing tape.

In some player/recorders, the drum in which the playing head is mounted rotates at a high rate of speed. In other player/recorders, the drum for the playing head remains stationary, while the playing head itself rotates at a high rate of speed along the circumference of the drum. During the normal mode of operation, the magnetic tape which is either being played or on which the recording is being made moves along its length at a controlled rate of speed adjacent the playing head. If the drum of the playing head is stationary, the relative movement between the magnetic tape and the drum is at a substantially lower level. On the other hand, if the drum is rotated at a high rate of speed (e.g. 1000 to 2000 revolutions per minute), the relative speed between the drum and the magnetic tape is rather high.

In general, the cassette cleaners have had the cleaning ribbon mounted in one of two ways. In one arrangement, the cleaning ribbon is moved out of the cassette housing into engagement with the drum of the cleaning head, and the cleaning ribbon does not move along its axial length. Thus, it is the rapid rotation of the drum of the cleaning head which accounts for the relative movement between the cleaning ribbon and the drum. In the second arrangement, the cleaning ribbon is mounted on spools within the cassette housing so that after it is moved out of the cassette housing into cleaning engagement with the drum (and possibly other components of the player/recorder), the cleaning ribbon moves along its axial length at substantially the same rate of speed as the magnetic tape in the normal mode of operation of the player/recorder. In either case, there is relative movement between the cleaning ribbon and the drum of the playing head.

One of the major problems in providing such cassette cleaners is the sensitivity of the operating components of the various player/recorders. For example, the cassettes for magnetic tapes generally have two spools which engage spindles of the player/recorder. During normal operations, the magnetic tape will be unwound from one spool and wound onto the other. If the spindles sense a resistance to rotation greater than a certain level, this will generally activate a shutoff mechanism in the player/recorder. The reason for this is that the increased resistance indicates a problem, and the player/recorder shuts off to avoid damage to the magnetic tape.

In addition, a number of player/recorders have other shutoff mechanisms. For example, there are the capstan and pinch roller which grip opposite sides of the tape, with the capstan being rotated under power so as to cause rotation of the pinch roller and move the magnetic tape along its length at a controlled rate. If for some reason the capstan is not causing the corresponding rotation of the pinch roller, so that the tape is not being moved, this might also trigger a shutoff mechanism.

Generally, the magnetic tape is made of a quite thin, rather flexible, low friction material. However, the cleaning ribbon of a cassette cleaner, in order to perform its cleaning function properly, has a somewhat different structure. First, it will generally be made of an absorbant material so that it can absorb a cleaning liquid. Second, since the cleaning is achieved by a wiping action against the drum, and possibly other components of the player/recorder, the friction of the cleaning ribbon moving relative to the drum may be somewhat greater than the friction of the conventional magnetic tape moving through the player/recorder and against the drum. Further, the cleaning ribbon is quite often made somewhat thicker than the conventional magnetic tape, so it would be more absorbant, with the result that if the cleaning ribbon is arranged so that it moves through the player/recorder along generally the same path as the magnetic tape, the greater stiffness of the cleaning ribbon (relative to the magnetic tape) might create greater resistance to the movement of the cleaning ribbon. Overall, these various operating characteristics of the cleaning ribbon sometimes create sufficient resistance to the operating components of the player/recorder so as to trigger an automatic shutoff mechanism of the player/recorder, thus prematurely stopping the cleaning action.

There have been various attempts to lower the resistance created by the cleaning ribbon, such as modifying the material used, the thickness of the material, the absorbancy of the material, etc. Quite often, such attempts to decrease the frictional resistance or other resistance have the effect of diminishing the cleaning effectiveness of the ribbon, thus making the ultimate selection, configuration and arrangement of the ribbon a compromise between its cleaning characteristics and other operating characteristics.

Accordingly, it is an object of the present invention to provide a cleaning device, and more particularly a cleaning ribbon to be used in a cassette cleaner, which enhances the operating characteristics of the ribbon relative to the components of the player/recorder, while not diminishing the cleaning effectiveness of the ribbon, and even possibly enhancing the cleaning effectiveness of the ribbon.

SUMMARY OF THE INVENTION

The present invention is incorporated in a cleaning device particularly adapted to clean a drum and a playing head of a player/recorder apparatus which has an operating mode in which a magnetic tape is located in a receiving area of the apparatus, and the tape moves relative to the playing head and the drum. The device has a housing adapted to be placed in the receiving area and a cleaning ribbon is mounted to the housing. The cleaning ribbon has a contact surface which, in a cleaning mode of the ribbon, comes into frictional engagement with the drum and the head, with the contact surface and the head moving relative to one another in a cleaning action. The ribbon has its contact surface formed with an alternating pattern of raised portions protruding outwardly from the ribbon and recessed portions. The recessed portions and the raised portions are spaced from one another relative to a lengthwise axis of the ribbon.

In the preferred form, the raised portions extend across the lengthwise axis of the ribbon. More particularly, each of the raised portions has a lengthwise axis with a substantial component of alignment perpendicular to the lengthwise axis of the ribbon.

In the preferred form, the recessed portions are located below a plane occupied by the raised portions by a dimension at least as great as 0.002 inch, preferrably, the dimension would be at least as great as 0.005 inch.

Also, in the preferred embodiment, the recessed portions and the raised portions each have a width dimension generally parallel to the longitudinal axis of the ribbon, with the width dimension of the raised portions being greater than the width dimension of the recessed portions. In the particular embodiment shown herein, the width dimension of the recessed portions is about ⅓ of the width dimension of the raised portions.

The present invention also relates to the cleaning ribbon itself, which is adapted to be placed in cleaning engagement with the drum and playing head. Also, the present invention includes a method of using such a ribbon so as to place it into frictional engagement with the cleaning head and drum. Then relative motion between the ribbon and the cleaning head and drum is effected, so as to cause cleaning action of the drum and head.

Further, it is contemplated that in the present invention a cleaning solution would be applied to the ribbon so that the cleaning solution would be applied to the surface of the playing head and drum.

Other features of the present invention will become apparent from the following detailed description.

DESCRIPTION OF THE PREFERRED EMBODIMENTS

The present invention is particularly adapted to clean the operating components of a video recording/playing unit which is adapted to accept cassette-type playing tapes. Accordingly, it is believed that a clearer understanding of the present invention will be obtained by first describing the operating components of a conventional video playing/recording unit. In the following description, the video playing/recording unit 10 will be referred to as "the video unit" or simply as "unit".

Figure 1:
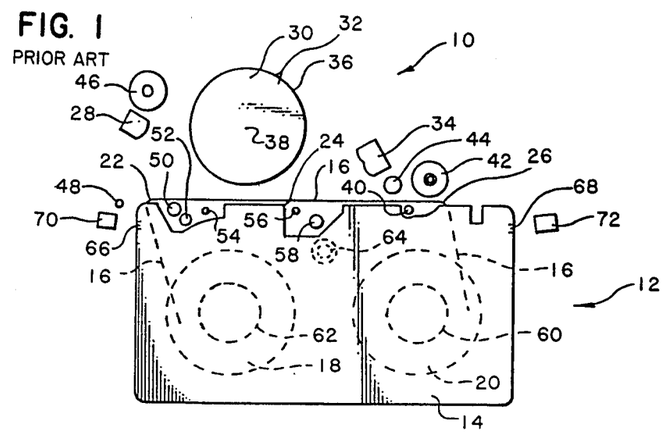
FIG. 1 is a plan view of a typical video tape cassette and the operating components of a video player/recorder, with the tape being in its retracted position in the cassette.
Figure 2:
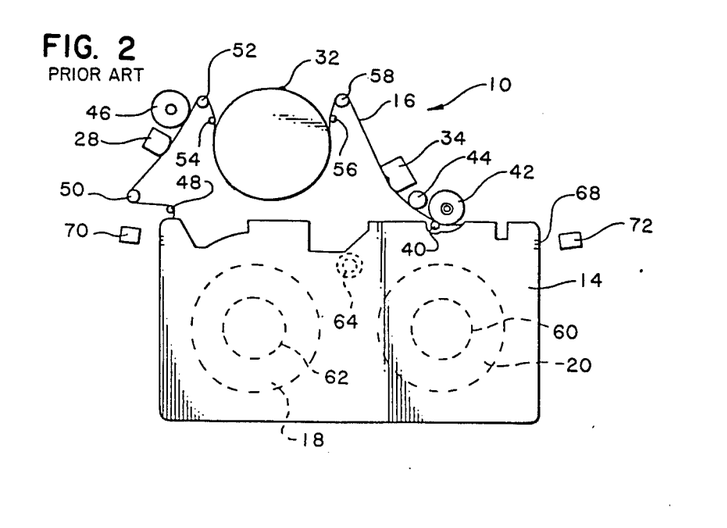
FIG. 2 is a view similar to FIG. 1, illustrating the tape being extracted from the cassette and in its operating position.

In FIGS. 1 and 2, some of the main operating components of the video unit 10 are shown in plan view, with a conventional tape cassette also being shown in plan view in its operating position in the video unit. In the illustrations of FIGS. 1 and 2, the housing, circuit componets, operating knobs and certain other components of the video unit 10 are not shown, since these are not required for an understanding of the present invention.

The tape cassette 12 comprises a case or housing 14 and a magnetic tape 16. The tape 16 is wound on right and left spools 18 and 20, the tape extending from one spool 18 to a location 22 at the front left corner of the case 14, thence along the front edge 24 of the case 14 to the right front location 26, and thence back to the right spool 20. In FIG. 1, the tape 16 is shown in its nonplaying or retracted position, and in FIG. 2 in its operating position.

To describe the operating components of the video unit 10, there are three magnetic operating components which either respond to the magnetic signals on the tape 16, affect the magnetic signals on the tape 16, or do both. These magnetic operating components are: an erase head 28, a drum 30 with a playing head or element 32, and an audio head 34. The drum 30 has the general configuration of a circular disc (i.e. a shallow cylinder), and has a peripheral cylindrically-shaped operating surface 36. The playing head or element 32 is mounted at the peripheral surface 36 and in this particular player/recorder, the drum 30 rotates about the center axis 38.

The unit 10 also comprises a number of mechanical components which operate directly on the tape 16 to properly position the tape 16 in the operating mode, and also to move the tape 16 along its operating path. First, there is a capstan 40 and a pinch roller 42. Further, there are guide rollers 44 and 46. Finally, there are six moveable guide members designated 48–58, respectively. In operation, these guide members 48–58 engage the back side of the tape 16 and move it outwardly into the playing position shown in FIG. 2.

There is a first drive sprocket 60 which fits into the center portion of the right spool 20 in a spline fitting so that it is able to drive the spool 20. There is a second take-up sprocket 62 which fits through the center of the left spool 18 in a spline fit. When the tape cassette 12 is initially placed in the unit 10, the unit 10 is in its nonoperating position, and the operating components are in the position shown in FIG. 1. When the unit 10 is placed in its operating mode, the guide members 48–58 move outwardly to the position of FIG. 2, and the pinch roller 42 moves rearwardly to press the right hand portion of the tape 16 against the capstan 40. Also, the drive sprocket 60 rotates the sprocket 20 clockwise to cause the tape 16 to be wound thereon.

There is a shutoff light 64 which fits in a matching recess formed in the portal forward middle portion of the bottom of the case 14. At the forward portions of the left and right edges of the case 14, there are two openings 66 and 68, respectively. The unit 10 has a left photocell 70 positioned adjacent the left side of the case 14 and in alignment with the light 64 and the left opening 66. In some instances, there may be a right photocell 72 positioned adjacent the right side of the case 14 and in alignment with the light 64 and the right opening 68. During normal operation, the photocell 70 (and the photocell 72 if it exists) is shielded by the tape. However, when the tape 16 travels to its end position, there is a clear leader portion which permits the light 58 to activate the photocell 70 (or the photocell 72) to activate the shutoff mechanism in the unit 10.

It is to be understood that the video player 10, the tape cassette 12 and the above-described mode of operation of these, already exist in the prior art.

Figure 3:
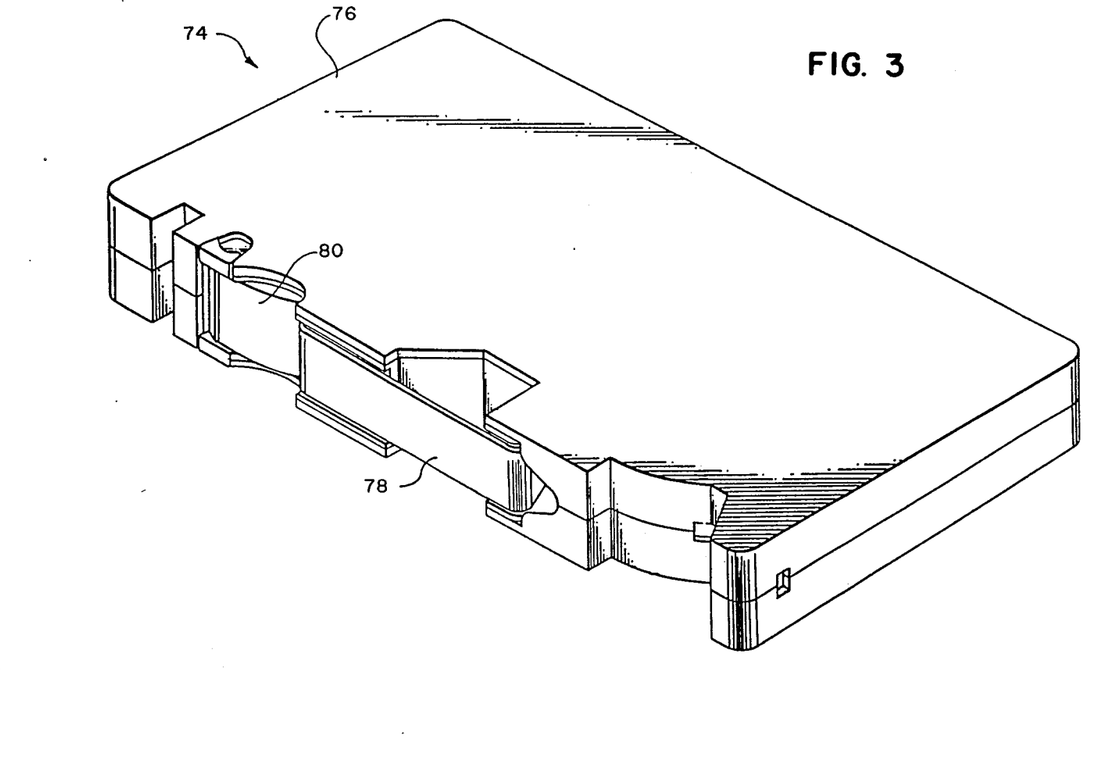
FIG. 3 is an isometric view of a cassette cleaner incorporating the present invention.

The cleaning device of the present invention is generally designated 74. This device 74 generally comprises a housing 76 and a cleaning ribbon 78. The housing 76 and the general mounting arrangement of the ribbon 78 in the housing 76 already exist, in and of themselves, in the prior art. Accordingly, these various prior art components will first be described rather briefly, after which there will be more detailed description of the structure of the cleaning ribbon 78, this being the essence of the present invention.

Figure 4:
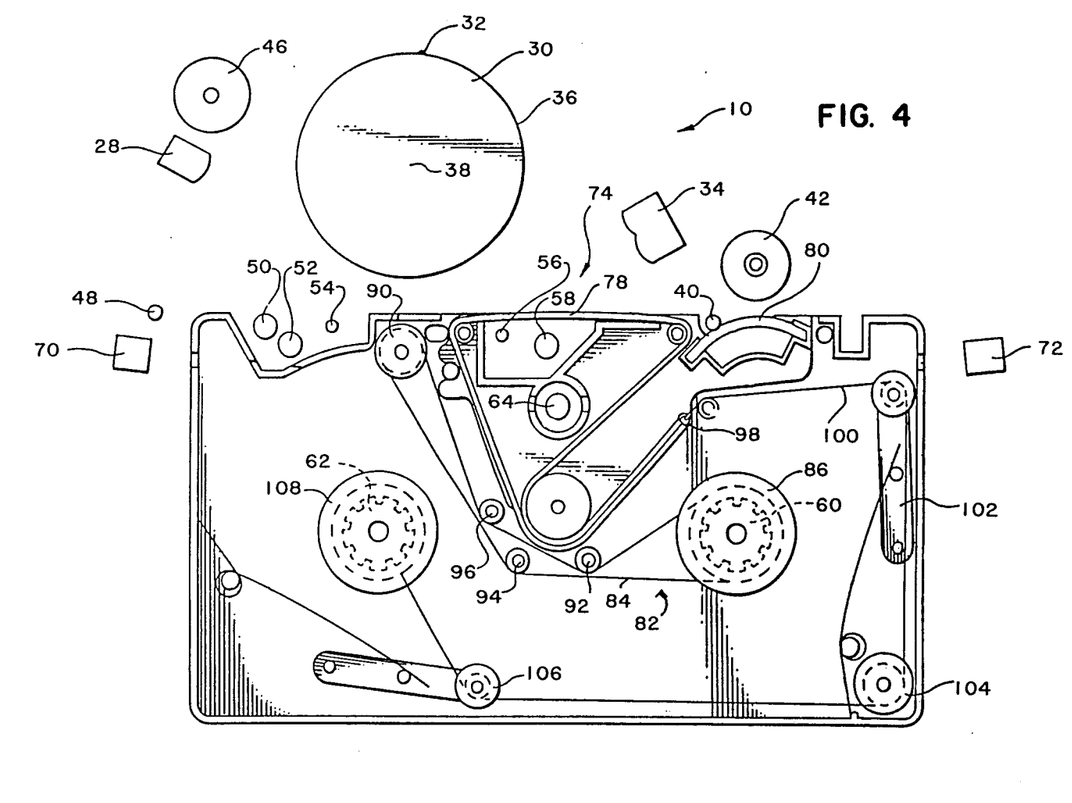
FIG. 4 is a top plan view of the cassette cleaner of FIG. 3, shown in its operating condition, and with the cover removed for purposes of illustration, and with the cleaning ribbon in its retracted position.

At the right forward end of the case 76, there is a stationary cleaning pad 80 that is positioned to engage the capstan 40 and pinch roller 42. There is a shutoff mechanism 82 made up of a shutoff ribbon 84 mounted at one end to a spool 86 and at the other end to a roller 90. The ribbon 84 also is appropriately located by three guide rollers 92–96, respectively. This ribbon 84 is generally opaque, but has a pair of transparent portions which permit passage of light from the source 64 to the photocell 70 to cause the unit 10 to shut off at the completion of a cleaning cycle.

The ribbon 78 is formed in a closed loop and connects at its end portion to a wire connector 98 which is in turn connected to a tension ribbon 100. The tension ribbon 100 extends around a spring arm 102, a guide roller 104 and a second spring arm 106 to connect to a second spool 108.

Figure 5:
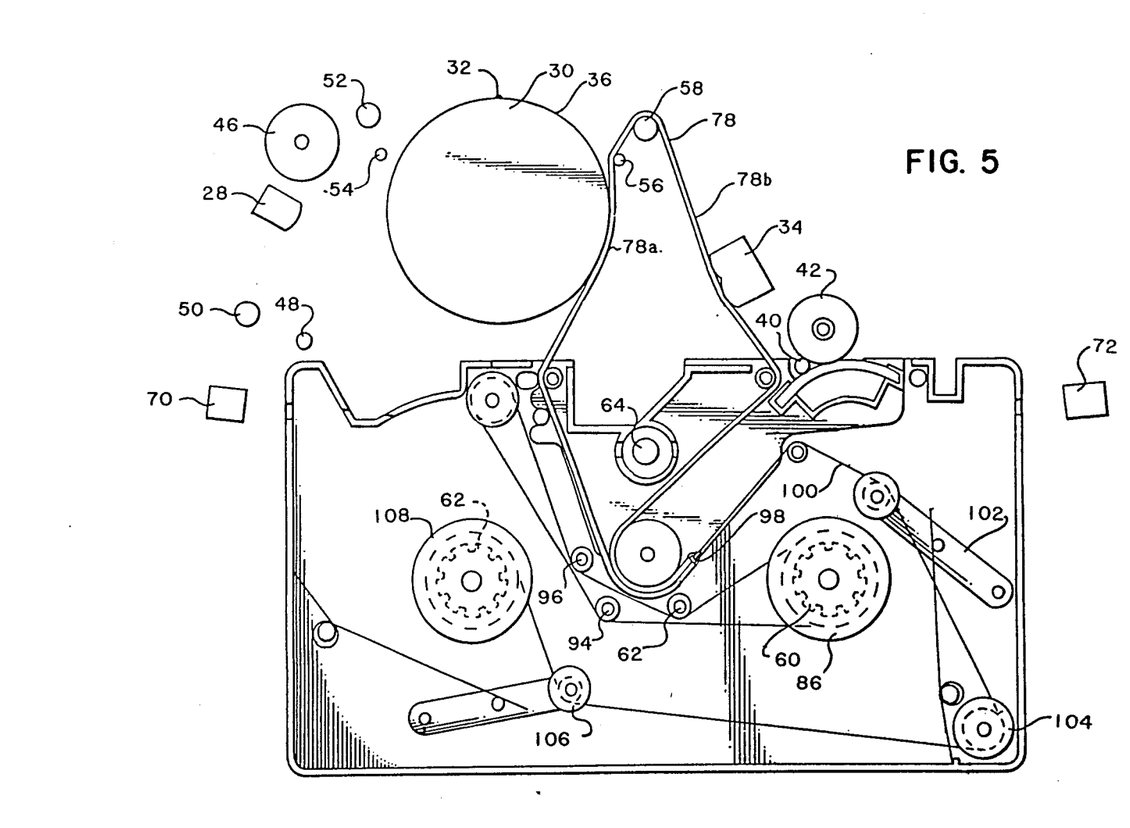
FIG. 5 is a view similar to FIG. 4, showing the cleaning ribbon extracted from the cassette cleaner and in its operating condition.

In operation, the cleaning device is placed into the receiving recess of the unit 10, so that the cleaning ribbon 78 is positioned forwardly of the two guide members 56 and 58. Then, the unit 10 is placed in its playing mode of operation so that the guide members 48–58 move outwardly, as shown in FIG. 5. It can be seen that the ribbon 78 is moved outwardly so that one portion 78a of the ribbon engages the surface 36 of the drum 30, with the ribbon portion 78a curving to conform to the surface 36. A second portion of the ribbon 78b is moved by the audio head 34. At the same time, the right spool 86 is rotated by the spindle 60 to cause the shutoff ribbon 84 to begin to travel along its length. When the transparent portions of the shutoff ribbon 84 come into proper position, the shutoff mechanism is activated to cause the guide members 48–58 to retract to the position of FIG. 4. The tension ribbon 100 pulls the ribbon 78 back toward the position shown in FIG. 4. The action of the tension ribbon 100 is enhanced by the rotation of the second spool 108.

It can be seen that during the cleaning operation of the unit 74, the ribbon 78 comes into frictional engagement with the rapidly rotating drum 30. The ribbon 78 remains stationary during the actual cleaning operation, while the relative motion between the cleaning ribbon 78 and the drum 30 is due to the rotation of the drum 30.

Before describing the configuration and arrangement of the ribbon 78 in detail, there will first be described a modified arrangement of a cassette cleaner also utilizing a cleaning ribbon. This will be described with reference to FIGS. 6–8.

Figure 6:
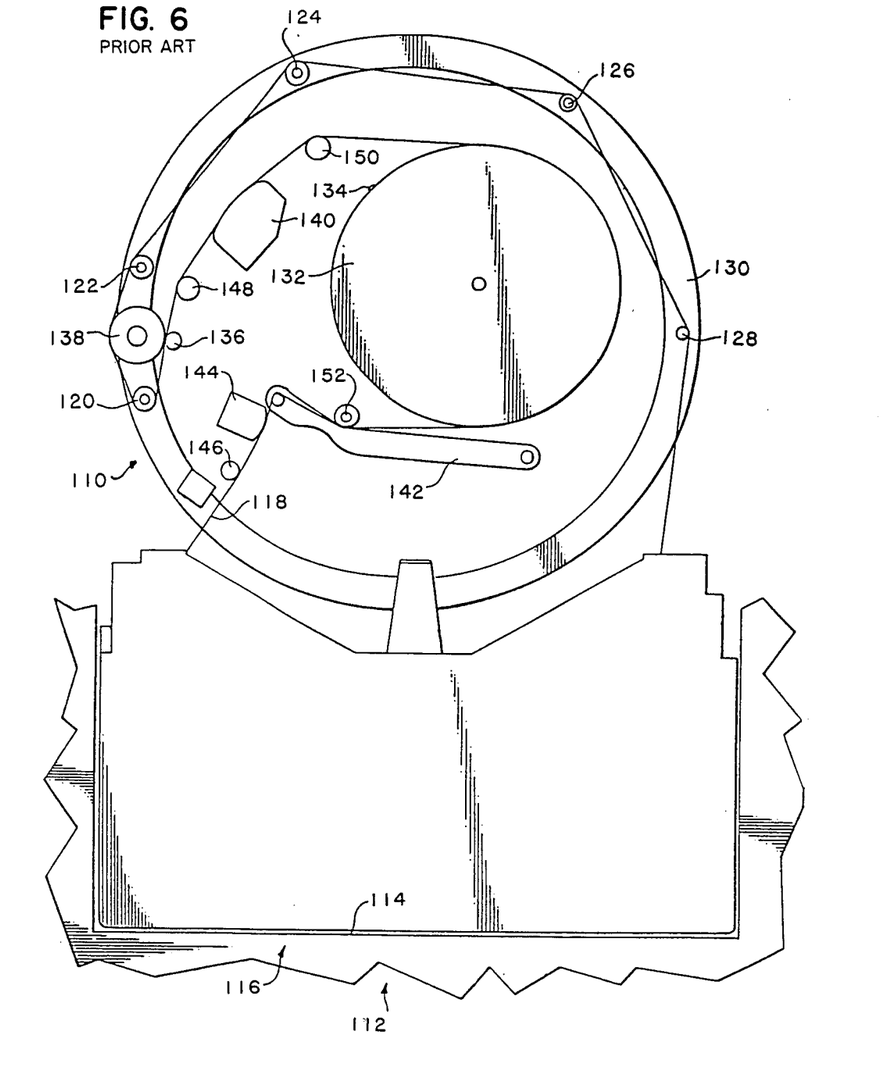
FIG. 6 is a plan view, similar to FIG. 2, showing the operating components of a second type of video player/recorder, with the magnetic tape being extracted from the cassette housing in an operating position.

In FIG. 6, there are shown portions of another which provides a recess 114 to receive a conventional tape cassette 116. The tape cassette 116 has mounted player/recorder unit 110, comprising a main housing 112 which provides a recess 114 to receive a conventional tape cassette 116. The tape cassette 116 has mounted therein a conventional magnetic tape 118 which is wound on spools located within the tape cassette 116. There are a plurality of movable guide members 120–128, mounted on a guide ring 130. The guide ring 130 rotates to cause the guide members 120–128 to engage the magnetic tape 118 and carry it to the playing position shown in FIG. 6. In this position, the tape 118 extends around a substantial circumferential portion of the drum 132 on which is mounted the playing head or element 134. The tape is caused to move along its length by means of a capstan 136 and a pinch roller 138. The tape 118 also comes in contact with an audio head 140. Also, there is a locating arm 142 which moves the tape 118 into engagement with an erase head 144. There are four stationary guide elements 146–152.

In the normal mode of operation, the magnetic tape 118 is in a retracted position extending across the front part of the tape cassette 116. When the unit 110 is activated to be in its operating mode, the ring 130 rotates so that the guide members 120–128 carry the tape 118 into the position shown in FIG. 6. As the tape 118 is being played, the capstan 136 and pinch roller 138 cause the tape 118 to move along its length at a controlled rate. At the completion of the cleaning cycle, the ring 130 rotates clockwise, to permit the tape 118 to be moved back to its retracted position, with the spool or spools in the tape cassette 116 rotating to take up the excess tape 118.

Figure 7:
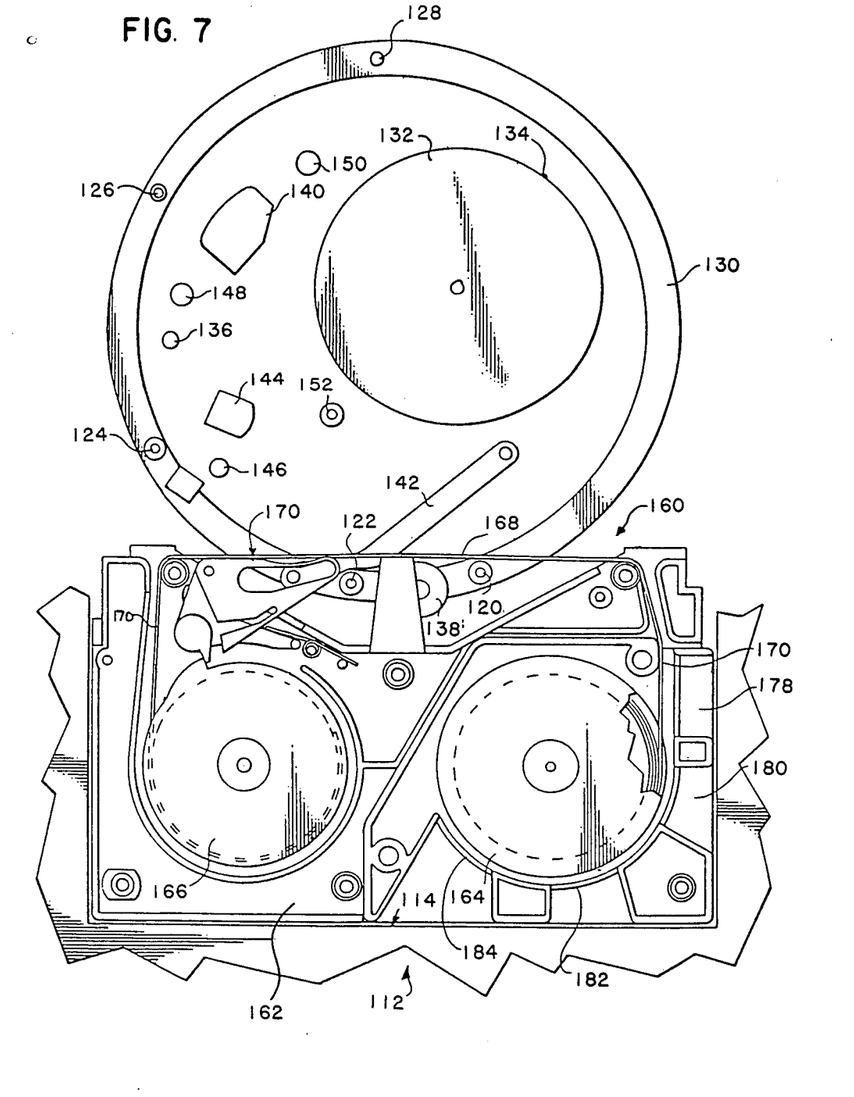
FIG. 7 is a plan view, similar to FIG. 4, showing a second type of cassette cleaner placed in a receiving area of the video player/recorder.

The cassette cleaner of the second embodiment of the present invention is generally designated 160, and it comprises a cassette-like housing structure 162 in which are mounted a pair of right and left spools 164 and 166, respectively. There is a cleaning ribbon 168 which is wound on the two spools 164 and 166. This cleaning ribbon 168 extends from the one spool 166 forwardly and thence along the forward portion of the cassette, and then rearwardly to be wound on the other spool 164. There is a limiting linkage 170, made up of a pair of links 172 and 174, respectively. The function of this linkage 172-174 is to limit the outward movement of the aforementioned locating arm 142.

The housing 162 has at its edge portions a plurality of windows or openings 178-184, through which a cleaning solution can be applied to the cleaning ribbon 168. Thus, when the cleaning ribbon 168 is moved outwardly to its cleaning position shown in FIG. 8, there are spaced wetted portions along the length of the ribbon 168. These are designated 178a, 180a, 182a and 184a, respectively, to correspond to the window locations 178-184 at which these ribbon portions are located at the time of the ribbon being wetted with the cleaning solution.

In operation, the cassette cleaner 160 is placed in the unit 110 in the same location which would be occupied by the conventional tape cassette 116. When the unit 110 is operated, the ring 130 rotates in a counterclockwise direction to pull the cleaning ribbon 168 outwardly to the position of FIG. 8.

Figure 8:
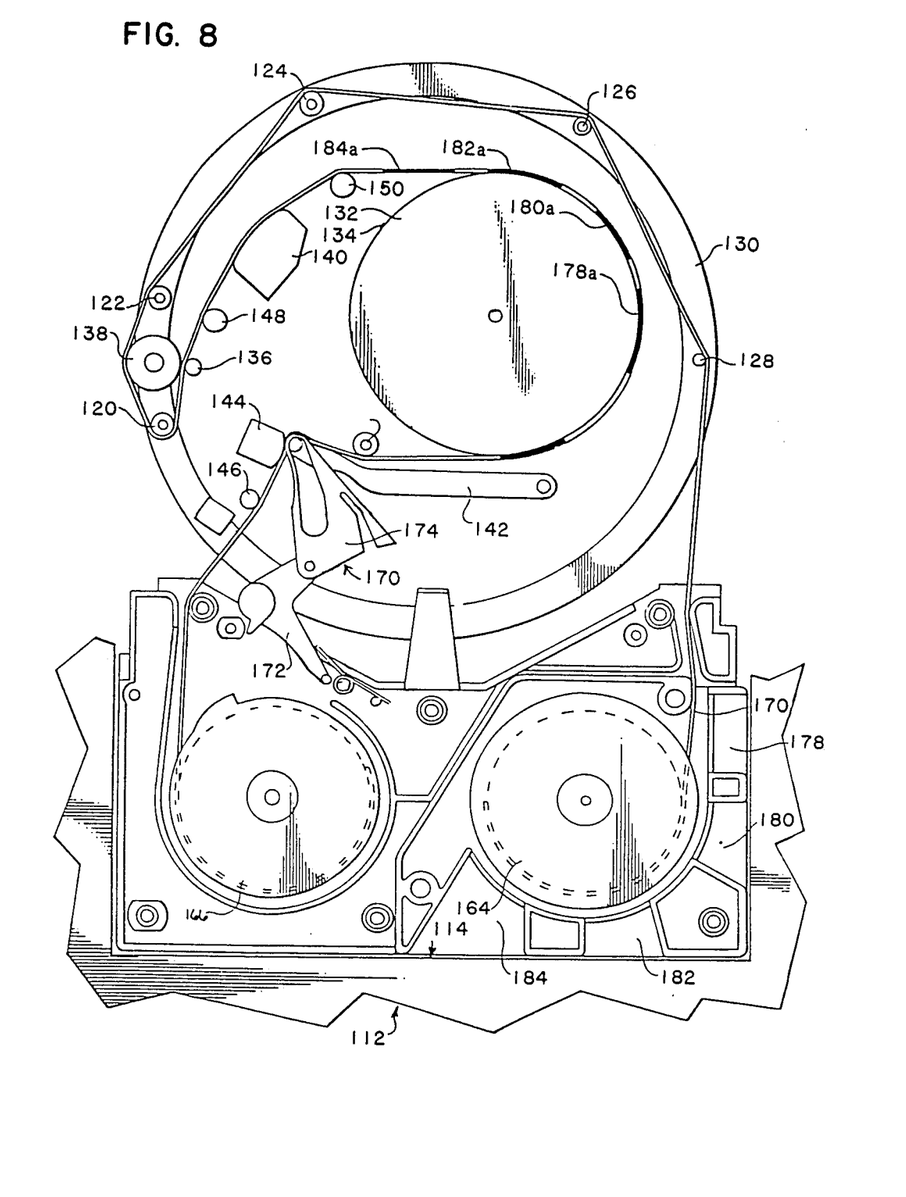
FIG. 8 is a view similar to FIG. 7, but showing the cleaning ribbon of the cassette cleaner extracted from the cassette housing and in its operating position.

The cleaning ribbon 168 is caused to move along its length by the action of the capstan 136 and pinch roller 138, so that the wetted ribbon portions 178a-184a move around the periphery of the drum 132. In some of the player/recorder units 110, the drum 132 itself remains stationary, while the playing head or element 134 moves in a circular path rapidly around the periphery of the drum 132. In such an instance, the relative motion between the cleaning ribbon 168 and the drum 132 is at a relatively slow rate. In other units 110, the drum 132 itself rotates at a relatively high rate (e.g. 1000 to 2000 revolutions per minute) in which case the relative motion between the ribbon 168 and the peripheral surface of the drum 132 is rather high.

The overall configurations of the two cassette cleaners 74 and 110, as shown herein, are already known in the prior art. Also, the manner of mounting each of the cleaning ribbons 78 and 168 in their respective cassette housings is also known in the prior art. Generally, the cleaning ribbons used in such prior art devices have had a width dimension of approximately ½ inch and a thickness dimension between about 0.012 to 0.03 inch. Various types of material have been used on such cleaning ribbons, these being: synthetic chamois-like material and woven nylon laminated in multiple layers, fibrous polyester and fibrous nylon.

In general, the cross-sectional configuration of such ribbons 78 and 168 has been substantially uniform, and the front and rear surfaces of such cleaning ribbons have been substantially flat.

Figure 9:
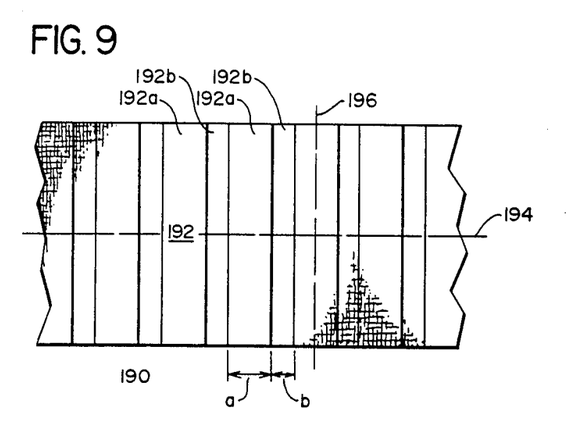
FIG. 9 is a view looking directly at the contact surface of a cleaning ribbon of the present invention, and indicating the boundaries of the recessed portions and raised portions of the ribbon.

It has been discovered that the operating characteristics of cleaning ribbons, such as shown at 78 and 168 can be improved substantially by forming the contact surface of the cleaning ribbon with an alternating pattern of raised portions protruding outwardly from the ribbon, with recessed portions being positioned between the raised portions. In FIG. 9, there is a section of cleaning ribbon 190 shown looking down onto its contact face 192. The contact face 192 is made up of a plurality of raised portions 192a, positioned alternately with a plurality of recessed portions 192b. For purposes of description, the lengthwise axis of the ribbon 190 is designated 194. The longitudinal dimension of each of the raised portions 192 (i.e. the dimension parallel to the lengthwise axis 194) is in the preferred embodiment 0.1 inch, and the longitudinal dimension of each of the recess portions 192 (i.e. again, the dimension parallel to the lengthwise axis 194) is about 0.05 inch. These dimensions are shown at "a" and "b", respectively.

Figure 10:
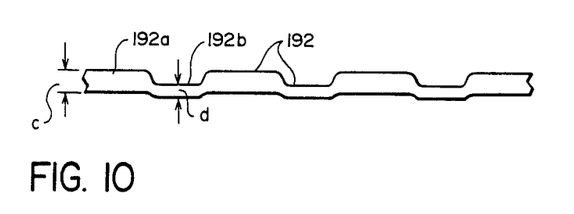
FIG. 10 is a side elevational view of the ribbon of FIG. 9, with the thickness dimension of the ribbon being somewhat exaggerated for purposes of illustration.

In FIG. 10, the ribbon 190 is shown in cross-section with the section line being taken along the longitudinal axis 194. The ribbon 190 is shown to a substantially enlarged scale with the thickness dimensions being shown out of proportion to the lengthwise dimension for purposes of illustration. The thickness dimension (illustrated at "c") of each of the raised portions 192 is approximately 0.008 inch. The thickness dimension (indicated at "d") of each of the recessed portions 192 is about 0.003 inch.

It is to be recognized that the dimensions (i.e. a, b, c and d) given above are dimensions which have been found to provide satisfactory results in the present invention. However, it is to be understood that these dimensions could be varied within the teachings of the present invention. With respect to the difference between the thickness dimension "c" of the raised portion 192a and the thickness dimension "d" of the recessed portion 192b, it has been found that within limits the increasing of the difference of these two dimensions "c" and "d" can bring about improved results. For example, it has been found that when the dimension "c" was made to be about 0.006 inch, and the dimension "d" about 0.004 inch, the cleaning tape 190 was less effective relative to reducing friction, than when the "c" dimension was made about 0.008 inch and the "d" dimension was made about 0.003 inch.

With regard to overall configuration, the raised portions 192a extend across the width of the ribbon 190, with a center axis 196 of each of these raised portions 192a being generally perpendicular to the lengthwise axis 194 of the ribbon 190.

It has been found that by providing the ribbon 190 in the configuration shown in FIGS. 9 and 10, the resulting frictional force between the ribbon 190 and the peripheral surface of the drum (such as that shown at 30 in the first embodiment and at 132 in the second embodiment) is decreased by use of the ribbon 190. While the phenomena contributing to this reduced friction are likely not understood entirely by the applicants, the following explanation can be proposed with some justification.

First, by an application of the normal laws of physics, the frictional force between two bodies moving relative to one another would depend essentially upon two factors, namely the coefficient of friction which exist between the surfaces of the two bodies, and second the force which is applied normal to the plane along which the surfaces of the two bodies contact one another. Normally, where the applied force to press the surfaces together remains constant, the frictional force would be independent of the contact area, since an increase in contact area would simply decrease the unit pressure in any one location (thus decreasing the frictional force for that unit area of contact), while a decrease in the area of contact would simply increase the force applied at any unit area of contact. However, it is believed that other physical phenomena contribute to the results of the present invention.

First, it is believed that the recessed portions 192b create certain rather shallow pockets of air which tend to break a suction which might otherwise be created between the tape and the drum surface.

Another factor is the manner in which the frictional engagement of the tape and the peripheral drum surface is changed by the application of cleaning liquid to the ribbon 190. (Such cleaning liquid is generally made of an alcohol with certain cleaning solvents therein, such as trichlorotrifluoroethane, commonly known as "Freon".

By wetting certain portions of the ribbon 190, the frictional force between the ribbon 190 and the drum surface is increased moderately. Again, it is believed that the wetting of the ribbon 190 produces some sort of adhesion or suction of the ribbon 190 against the drum surface. However, by providing the alternating pattern of raised portions 192a and recess portions 192b, this suction or adhesion which increases the drag of the ribbon moving over the drum is alleviated to some extent.

To provide a physical demonstration of this, the following experiment was performed. First, there was provided a shallow steel cylinder, having a diameter of three inches, and a thickness dimension of one inch. This cylinder was mounted for rotation about its central longitudinal axis and disposed with its axis of rotation horizontal. The cylinder was mounted to a drive axel which was in turn connected to a speed reducing gear drive, which in turn was connected to an electric motor, so that the cylinder was rotated about twenty revolutions per minute.

Then, a typical cleaning ribbon was draped over the upper semicircular peripheral surface portion of the cylinder. One lower end of the ribbon was attached to a spring member, and the opposite lower end of the ribbon was attached to a small weight (i.e. a ¼ ounce weight).

The drum was then rotated under power in a direction so that the peripheral surface of the drum rotated away from the spring and toward the weight. Thus, the frictional force contributed by the drum moving relative to the ribbon would tend to stretch the spring further, while causing the weight to drop further.

First, a conventional ribbon (i.e. one made of spun bonded nylon, and having a flat uniform contact surface) was placed in the experimental setup, with the ribbon being dry. The rotation of the cylinder began, and the increment of distance which the spring stretched was measured. Then, several drops of cleaning liquid were placed at spaced locations along the peripheral surface of the ribbon which was in contact with the drum. The cleaning liquid was applied through a dropper so that the volume of liquid being dispensed from the dropper could be controlled with reasonable accuracy. The immediate effect of applying the liquid was that the drag force between the drum and the ribbon was abruptly increased so that the spring was stretched. After a period of about two seconds, the drag force became somewhat less so that the spring retracted to a certain extent, but not to its position which it occupied when the ribbon was totally dry.

To equate this to the operation of a cleaning ribbon in an actual player/recorder, it can be surmised that when the wetted portions of the cleaning ribbon come into contact with the drum, there is a more abrupt increase in the resisting frictional force. It is this force which likely contributes to the premature shutoff of the player/recorder during operation.

The conventional ribbon was then removed from the experimental setup, and the ribbon 190 of the present invention was placed in the experimental setup, with one end of the ribbon being connected to the spring and the other to the known weight. This ribbon was made of the same spun-bonded nylon, but had the embossed pattern shown in FIG. 10. The same procedure was followed. It was found that the elongation of the spring was significantly less, not only when the ribbon 190 was totally dry, but also when the cleaning solution was applied to the ribbon 190.

Also, in actually using the ribbon 190 to clean video cleaners, it was found empirically that the ribbon of the present invention, used under the same circumstances as a conventional ribbon, had significantly less tendency to cause the player/recorder unit to shut off.

In the preferred embodiment, the raised portion 192a and recessed portion 192b have been shown as extending perpendicular to the lengthwise axis of the ribbon, and having a generally rectangular configuration. However, it is to be recognized that within the broader aspects of the present invention, the orientation and shape of the raised and recessed portions of the ribbon could be modified

We claim:

1. In a cleaning device particularly adapted to clean a drum and playing head of a player/recorder apparatus which has an operating mode in which a magnetic tape is located in a receiving area of the apparatus, and the tape moves relative to the playing head and the drum, said device having a housing adapted to be placed in said receiving area and a cleaning ribbon which is capable of being wetted and which is mounted to said housing and has an outer back surface and an inner contact surface which, in a cleaning mode of said device, comes into frictional cleaning engagement with at least said drum, with the contact surface and the head moving relative to one another in a cleaning action, an improvement comprising:
said ribbon having a lengthwise axis and a contact surface plane which is parallel to said lengthwise axis and at which said ribbon contacts said drum, said ribbon comprising a plurality of first raised sections and second recessed sections, extending across said lengthwise axis, which sections are positioned alternately with respect to one another in parallel planes, each of said first sections having a planar inner cleaning surface portion which is positioned in said contact surface plane, each of said second sections being contoured relative to adjacent ones of said first sections in a manner that an inner surface portion of each of said second sections is spaced outwardly from the inner cleaning surface portions of the adjacent first section;
whereby, when said cleaning ribbon has a cleaning solution applied thereto, and is placed into frictional cleaning engagement with said drum, said cleaning ribbon exerts a relatively smaller resisting frictional force against said drum in comparison with a ribbon having a substantially uniform contact surface.

2. The improvement as recited in claim 1, wherein each of said first sections has a lengthwise axis with a substantial component of alignment perpendicular to the lengthwise axis of the ribbon.

3. The improvement as recited in claim 1, wherein the inner surface portion of each of said second sections is located outwardly of said contact plane by a dimension at least as great as about 0.002 inch.

4. The improvement as recited in claim 3, wherein the inner surface portion of each of said second sections is located outwardly of said contact plane by a dimension at least as great as about 0.005 inch.

5. The improvement as recited in claim 1, wherein said first sections and said second sections each has a width dimension generally parallel to the longitudinal axis of the ribbon, with the width dimension of the first sections being greater than the width dimension of the second sections.

6. The improvement as recited in claim 5, wherein the width dimension of the second sections is about ½ of the width dimension of the first sections.

7. The improvement as recited in claim 1, wherein said housing has opening means permitting a wetting solution to be applied to said cleaning ribbon.

8. The improvement as recited in claim 1, wherein the first sections each has a lengthwise axis having an alignment component substantially perpendicular to the lengthwise axis of the ribbon, said first sections each having a width dimension parallel to the lengthwise axis of the ribbon of about 0.1 inch, said second sections each having a width dimension parallel to the lengthwise axis of the ribbon which is about ½ of the width dimension of the first sections, and said inner surface portion of each of said second sections being positioned outwardly of the contact plane by a dimension of at least about 0.005 inch.

9. A cleaning ribbon adapted to be used in a cleaning device to clean a drum and playing head of a player/recorder apparatus which has an operating mode in which a magnetic tape is located in a receiving area of the apparatus, and the tape moves relative to the playing head and the drum, said cleaning ribbon adapted to be placed in said receiving area and having an outer back surface and an inner contact surface which, in a cleaning mode of said ribbon, comes into frictional cleaning engagement with at least said drum, with the contact surface and the head moving relative to one another in a cleaning action, said ribbon having a lengthwise axis and a contact surface plane which is parallel to said lengthwise axis and at which said ribbon contacts said drum, said ribbon comprising a plurality of first and second sections, extending across said lengthwise axis, which sections are positioned alternately with respect to one another in parallel planes, each of said first sections having a planar inner cleaning surface portion which is positioned in said contact surface plane, each of said second sections being contoured relative to adjacent ones of said first sections in a manner that an inner surface portion of each of said second sections is spaced outwardly from the inner cleaning surface portions of the adjacent first section;

whereby, when said cleaning ribbon has a cleaning solution applied thereto, and is placed into frictional cleaning engagement with said drum, said cleaning ribbon exerts a relatively smaller resisting frictional force against said drum in comparison with a ribbon having a substantially uniform contact surface.

10. The ribbon as recited in claim 9, wherein each of said second sections has a lengthwise axis with a substantial component of alignment perpendicular to the lengthwise axis of the ribbon.

11. The ribbon as recited in claim 9, wherein the inner surface portion of each of said second section is located outwardly of said contact plane by a dimension at least as great as about 0.002 inch.

12. The ribbon as recited in claim 11, wherein the inner surface portion of each of said second sections is located outwardly of said contact plane by a dimension at least as great as about 0.005 inch.

13. The ribbon as recited in claim 9, wherein said first sections and said second sections each has a width dimension generally parallel to the longitudinal axis of the ribbon, with the width dimension of the first sections being greater than the width dimension of the second sections.

14. The ribbon as recited in claim 13, wherein the width dimension of the second sections is about ½ of the width dimension of the first sections.

15. The ribbon as recited in claim 9, wherein the first sections each has a lengthwise axis having an alignment component substantially perpendicular to the lengthwise axis of the ribbon, said first sections each having a width dimension parallel to the lengthwise axis of the ribbon of about 0.1 inch, said second sections each having a width dimension parallel to the lengthwise axis of the ribbon which is about ½ of the width dimension of the first sections, and said inner surface portion of each of said second sections being positioned outwardly of the contact plane by a dimension of at least about 0.005 inch.

16. A method of cleaning a drum and playing head of a player/recorder apparatus which has an operating mode in which a magnetic tape is located in a receiving area of the apparatus, and the tape moves relative to the playing head and the drum, said method comprising:
  a. providing a cleaning ribbon which is capable of being wetted and has an outer back surface and an inner contact surface, said ribbon having a lengthwise axis and a contact surface plane which is parallel to said lengthwise axis and at which said ribbon is able to contact said drum, said ribbon comprising a plurality of first and second sections, extending across said lengthwise axis, which sections are positioned alternately with respect to one another in parallel planes, each of said first sections having a planar inner cleaning surface portion which is positioned in said contact surface plane, each of said second sections being contoured relative to adjacent ones of said first sections in a manner that an inner surface portion of each of said second sections is spaced outwardly from the inner cleaning surface portions of the adjacent first sections;
  b. wetting said ribbon with a cleaning liquid and placing said ribbon in the receiving area and causing the contact surface of the ribbon to come into engagement with the head and drum, while causing relative motion between said cleaning ribbon and said drum and head, so that the contact surface is in frictional cleaning engagement with at least the drum.

17. The method as recited in claim 16, wherein each of said second sections has a lengthwise axis with a substantial component of alignment perpendicular to the lengthwise axis of the ribbon.

18. The method as recited in claim 16, wherein the inner surface portion of each of said second sections is located outwardly of said contact plane by a dimension at least as great as about 0.002 inch.

19. The method as recited in claim 18, wherein the inner surface portion of each of said second sections is located outwardly of said contact plane by a dimension at least as great as about 0.005 inch.

20. The method as recited in claim 16, wherein said first sections and said second sections each has a width dimension generally parallel to the longitudinal axis of the ribbon, with the width dimension of the first sections being greater than the width dimension of the second sections.

21. The method as recited in claim 20, wherein the width dimension of the second sections is about ½ of the width dimension of the first sections.

22. The method as recited in claim 21, wherein the first sections each has a lengthwise axis having an alignment component substantially perpendicular to the lengthwise axis of the ribbon, said first sections each having a width dimension parallel to the lengthwise axis of the ribbon of about 0.1 inch, said second sections each having a width dimension parallel to the lengthwise axis of the ribbon which is about ½ of the width dimension of the first sections, and said inner surface portion of each of said second sections being positioned outwardly of the contact plane by a dimension of at least about 0.005 inch.

* * * * *